United States Patent
Ajad et al.

(10) Patent No.: US 12,451,236 B2
(45) Date of Patent: Oct. 21, 2025

(54) METHOD OF ANALYZING X-RAY IMAGES AND REPORT GENERATION

(71) Applicant: L&T TECHNOLOGY SERVICES LIMITED, Chennai (IN)

(72) Inventors: Ashok Ajad, Uttar Pradesh (IN); Taniya Saini, Gujarat (IN); Ansuj Joshi, Madhya Pradesh (IN); Swaroop Kumar Mysore Lokesh, Karnataka (IN)

(73) Assignee: L&T TECHNOLOGY SERVICES LIMITED, Chennai (IN)

( * ) Notice: Subject to any disclaimer, the term of this patent is extended or adjusted under 35 U.S.C. 154(b) by 0 days.

(21) Appl. No.: 18/011,114

(22) PCT Filed: Jun. 10, 2022

(86) PCT No.: PCT/IB2022/055395
§ 371 (c)(1),
(2) Date: Dec. 16, 2022

(87) PCT Pub. No.: WO2023/067397
PCT Pub. Date: Apr. 27, 2023

(65) Prior Publication Data
US 2024/0120070 A1    Apr. 11, 2024

(30) Foreign Application Priority Data
Oct. 19, 2021    (IN) .............................. 202141047320

(51) Int. Cl.
*G06K 9/00*    (2022.01)
*G06T 7/70*    (2017.01)
(Continued)

(52) U.S. Cl.
CPC ............... *G16H 30/40* (2018.01); *G06T 7/70* (2017.01); *G06V 10/25* (2022.01); *G06V 10/70* (2022.01); *G16H 15/00* (2018.01)

(58) Field of Classification Search
CPC ................... G06N 3/0464; G06N 3/08; G06T 2207/20081; G06T 2207/10116;
(Continued)

(56) References Cited

U.S. PATENT DOCUMENTS 10,504,227 B1 *   12/2019   Chilamkurhy ......... G06N 3/084
11,537,918 B2 *   12/2022   Muschett .............. G06F 16/285
(Continued)

*Primary Examiner* — Hadi Akhavannik
(74) *Attorney, Agent, or Firm* — Kendal M. Sheets

(57) ABSTRACT

A method of analyzing images and generating a report is disclosed. The method may include inputting a test image to a trained prediction model. The trained prediction model may be a deep learning-based model. The method may further include obtaining at least one abnormality associated with the test image, using the trained prediction model. The method may further include identifying at least one relevant predetermined region from a plurality of predetermined regions associated with the test image, using the trained prediction model, based on the at least one abnormality. Each of the at least one relevant predetermined region is identified based on hierarchical classification. The method may further include determining within each of the at least one relevant predetermined region, a location associated with the at least one abnormality.

15 Claims, 10 Drawing Sheets

(51) Int. Cl.
*G06V 10/25* (2022.01)
*G06V 10/70* (2022.01)
*G16H 15/00* (2018.01)
*G16H 30/40* (2018.01)

(58) Field of Classification Search
CPC .......... G06T 2207/20084; G06V 10/70; G06V 10/25; G16H 50/20; G16H 50/70
See application file for complete search history.

(56) References Cited

U.S. PATENT DOCUMENTS

| | | | |
|---|---|---|---|
| 11,948,298 B2* | 4/2024 | Abid | G06N 5/022 |
| 2020/0027545 A1* | 1/2020 | Xie | G16B 40/00 |
| 2020/0294654 A1* | 9/2020 | Harzig | G16H 15/00 |

* cited by examiner

METHOD OF ANALYZING X-RAY IMAGES AND REPORT GENERATION

CROSS-REFERENCE TO RELATED APPLICATIONS

The present application is a filing under 35 U.S.C. 371 as the National Stage of International Application No. PCT/IB2022/055395, filed Jun. 10, 2022, entitled "A METHOD OF ANALYZING X-RAY IMAGES AND REPORT GENERATION," which claims priority to Indian Application No. 202141047320 filed with the Intellectual Property Office of India on Oct. 19, 2021, both of which are incorporated herein by reference in their entirety for all purposes.

TECHNICAL FIELD

This disclosure relates generally to medical imaging, and more particularly to machine learning based analysis of X-ray images and automatic report generation.

BACKGROUND OF THE INVENTION

Medical imaging, for example, X-ray images, Computerized Tomography (CT) scans, Magnetic Resonance Imaging (MRI) images, Positron Emission Tomography (PET) images, and other diagnostic images are found highly effective in identifying various physiological abnormalities. For example, chest X-ray images may be examined for pulmonary and thoracic disease detection and analysis, upon obtaining an X-ray image, a radiologist or a physician, for example, may prepare a report based on the X-ray image. The prepared report may include impressions, findings, patient history, and additional tests that forms the basis of treatment.

These medical images (i.e. X-ray images) may be digitalized, in order to make data associated with the images easier to handle and communicate. Conventional AI-based X-ray analysis mechanisms are usually based on Convolutional Neural Network (CNN) models that have been trained to detect abnormalities in X-ray radiographs. Such CNN models can store algorithm reports and perform model inferencing on large-scale public datasets (such as Chexpert, MIMIC-CXR and PADCHEST). However, such traditional mechanisms may have drawbacks such as incorrect highlighting of certain regions in X-ray images and report inaccuracy. Furthermore, these traditional mechanisms may be expensive. Moreover, these traditional mechanisms entail complicated algorithm structures.

As such, there is a need for system and method with an artificial neural network (ANN) model that is cost effect and sensitive for detection and classification of anomalies from digital diagnostic images like digital X-ray radiographs and further generates a clinically and grammatically meaningful report corresponding to each of the classified anomalies.

SUMMARY OF THE INVENTION

In accordance with an embodiment, a method of analyzing images and generating a report is disclosed. The method may include inputting a test image to a trained prediction model. The trained prediction model may be a deep learning-based model. The method may further include obtaining at least one abnormality associated with the test image, using the trained prediction model. The method may further include identifying at least one relevant predetermined region from a plurality of predetermined regions associated with the test image, using the trained prediction model, based on the at least one abnormality. Each of the at least one relevant predetermined region is identified based on hierarchical classification. The method may further include determining within each of the at least one relevant predetermined region, a location associated with the at least one abnormality.

In accordance with another embodiment, a system of analyzing images and generating a report is disclosed. The system may include a processor and a memory communicatively coupled to the processor. The memory may store processor-executable instructions, which, on execution, causes the processor to input a test image to a trained prediction model. The trained prediction model may be a deep learning-based model. The processor-executable instructions may further cause the processor to obtain at least one abnormality associated with the test image, using the trained prediction model. The processor-executable instructions may further cause the processor to identify at least one relevant predetermined region from a plurality of predetermined regions associated with the test image, using the trained prediction model, based on the at least one abnormality. It should be noted that each of the at least one relevant predetermined region is identified based on hierarchical classification. The processor-executable instructions may further cause the processor to determine within each of the at least one relevant predetermined region, a location associated with the at least one abnormality.

In yet another embodiment, a non-transitory computer-readable storage medium is disclosed. The non-transitory computer-readable storage medium has computer-executable instructions stored thereon of analyzing images and generating a report. The computer-executable instructions may cause a computer comprising one or more processors to perform operations comprising inputting a test image to a trained prediction model. The trained prediction model may be a deep learning-based model. The operations may further include obtaining at least one abnormality associated with the test image, using the trained prediction model. The operations may further include identifying at least one relevant predetermined region from a plurality of predetermined regions associated with the test image, using the trained prediction model, based on the at least one abnormality. Each of the at least one relevant predetermined region is identified based on hierarchical classification. The operations may further include determining within each of the at least one relevant predetermined region, a location associated with the at least one abnormality.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF THE DRAWINGS

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

The following described implementations may be found in the disclosed method and system for analyzing images and generating a report, based on an Artificial Intelligence (AI) based model. The disclosed system and method may use AI models to process X-ray image and a raw report (i.e., the report manually prepared by a radiologist), detect findings from the X-ray image and the raw report, hierarchically classify each of the detected findings into a plurality of classes, and generate a clinically and grammatically meaningful report corresponding to each of the findings. The disclosed system may facilitate generation of reports, and consequently, the results may be returned to patients quickly, which aids in medical decision making. The various biases, lack of knowledge, or clerical errors made in the process of observing diagnostic images may be minimized with the disclosed system. The generated reports may save time for human clinicians, and identify measurements or values that qualify as abnormal, thereby reducing workflow burdens on the human clinicians.

Figure 1:
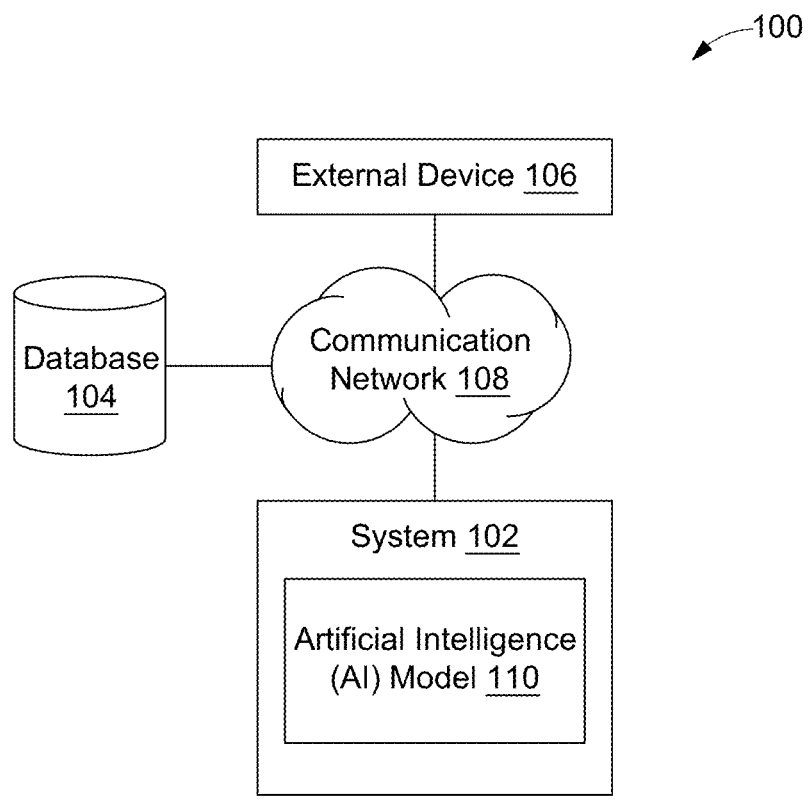
FIG. 1 is a block diagram of an environment for analyzing images and generating a report is illustrated, in accordance with an embodiment of the disclosure.

Referring now to FIG. 1, a block diagram of an environment for analyzing images and generating a report is illustrated, in accordance with an embodiment of the disclosure. As shown in the FIG. 1, the environment 100 may include a system 102, a database 104, an external device 106, and a communication network 108. The system 102 may be communicatively coupled to the database 104 and the external device 106, via the communication network 108. In some embodiments, the system 102 may include an AI model 110, as part of an application stored in memory of the system 102.

In some embodiments, the AI model 110 may include a deep learning model and a Natural Language Processing (NLP) model.

The system 102 may include suitable logic, circuitry, interfaces, and/or code that may be configured to analyze test images and corresponding raw report obtained from the database 104 using the AI model 110. Based on analysis, a report (i.e., clinically, and grammatically accurate report) may be generated by a report generating model and stored in the database 104. The AI model 110 may be trained to extract a radiological finding from the plurality of test images and the raw report corresponding to each of the plurality of test images. In accordance with an embodiment, each of the plurality of test images may include an image (such as, digital X-ray radiograph). To extract the radiological finding from the corresponding raw report, the AI model 110 may be configured to extract one or more features of abnormality from the corresponding raw report. Additionally, the AI model 110 (or the NLP model), may be trained to generate textual sentence(s) that correspond to a textual description that may be readable by a radiologist to know a condition of a patient in a structured manner. The AI model 110, once trained, may be deployable for applications (such as, a diagnostic application) which may take actions or generate real-time or near real-time inferences. By way of an example, the system 102 may be implemented as a plurality of distributed cloud-based resources by use of several technologies that are well known to those skilled in the art. Other examples of implementation of the system 102 may include, but are not limited to, medical diagnostic equipment, a web/cloud server, an application server, a media server, and a Consumer Electronic (CE) device.

The database 104 may include suitable logic, circuitry, interfaces, and/or code that may be configured to store data received, utilized and processed by the system 102. The data may correspond to output data from the report associated with abnormality detection in the test image. The output data may include at least one textual sentence and an actual inference corresponding to abnormality. The actual inference may include at least one textual sentence. In accordance with an embodiment, the database 104 may store a plurality of test images (such as, digital X-ray radiographs) that are used to train the AI model 110 by the system 102, or as an input to the trained AI model of the system in a test environment (e.g., for benchmarking) or in an application-specific deployment, e.g., applications related to abnormality detection.

In accordance with an embodiment, the database 104 may store Digital Imaging and Communications in Medicine (DICOM) data. In accordance with an embodiment, the database 104 may store, exchange, and transmit medical images and raw reports. The medical images may correspond to, but not limited to, radiography images, ultrasonography images, Computed Tomography (CT) scan images, Magnetic Resonance Imaging (MRI) images, radiation therapy images and the raw reports may correspond to the findings of the images. In accordance with another embodiment, the database 104 may store a final result and/or report generated by the system 102.

Although in FIG. 1, the system 102 and the database 104 are shown as two separate entities, this disclosure is not so limited. Accordingly, in some embodiments, the entire functionality of the database 104 may be included in the system 102, without a deviation from scope of the disclosure. The external device 106 may include suitable logic, circuitry, interfaces, and/or code that may be configured to deploy the AI model 110, as part of an application engine that may use the output of the AI model 110 to generate real or near-real time inferences, take decisions, clinically and grammatically accurate report or output prediction results for diagnosis of diseases. The AI model 110 may be deployed on the external device 106 once the AI model 110 is trained on the system 102. The functionalities of the external device 106 may be implemented in portable devices, such as a high-speed computing device, and/or non-portable devices, such as a server. Examples of the external device 106 may include, but are not limited to, medical diagnosis equipment, a smart phone, a mobile device, or a laptop.

The communication network 108 may include a communication medium through which the system 102, the database 104, and the external device 106 may communicate with each other. Examples of the communication network 108 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the environment 100 may be configured to connect to the communication network 108, in accordance with various wired and wireless communication protocols. Examples of such wired and wireless communication protocols may include, but are not limited to, a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

The AI model 110 may be referred to as a computational network or a system of artificial neurons, where each Neural Network (NN) layer of the AI model 110 includes artificial neurons as nodes. Outputs of all the nodes in the AI model 110 may be coupled to at least one node of preceding or succeeding NN layer(s) of the AI model 110. Similarly, inputs of all the nodes in the AI model 110 may be coupled to at least one node of preceding or succeeding NN layer(s) of the AI model 110. Node(s) in a final layer of the AI model 110 may receive inputs from at least one previous layer. A number of NN layers and a number of nodes in each NN layer may be determined from hyperparameters of the AI model 110. Such hyperparameters may be set before or while training the AI model 110 on a training dataset of images.

Each node in the AI model 110 may correspond to a mathematical function with a set of parameters, tunable while the AI model 110 is trained. These parameters may include, for example, a weight parameter, a regularization parameter, and the like. Each node may use the mathematical function to compute an output based on one or more inputs from nodes in other layer(s) (e.g., previous layer(s)) of the AI model 110.

The AI model 110 may include electronic data, such as, for example, a software program, code of the software program, libraries, applications, scripts, or other logic/instructions for execution by a processing device, such as the system 102 and the external device 106. Additionally, or alternatively, the AI model 110 may be implemented using hardware, such as a processor, a microprocessor (e.g., to perform or control performance of one or more operations), a field-programmable gate array (FPGA), or an application-specific integrated circuit (ASIC). In some embodiments, the AI model 110 may be implemented using a combination of both the hardware and the software program.

In some embodiments, the AI model 110 may include a first AI model and a second AI model. In accordance with an embodiment, the first AI model may correspond to the deep machine learning model (such as, a convolutional neural network model). In accordance with an embodiment, the second AI model may correspond to the NLP model. For example, the NLP model may include a Long Short-Term Memory (LSTM) model and transformers. In other words, the AI model 110 may implement the deep machine learning model and the NLP model. In accordance with an embodiment, the training of the AI model 110 may be performed to detect a plurality of abnormalities from a set of radiography images (i.e. a chest X-ray images and raw report). The AI model 110 may be trained to classify each of the plurality of abnormalities into a set of abnormality on the basis of their type and create a plurality of visual indicators and a clinically accurate report on each of the set of abnormality.

Figure 2:
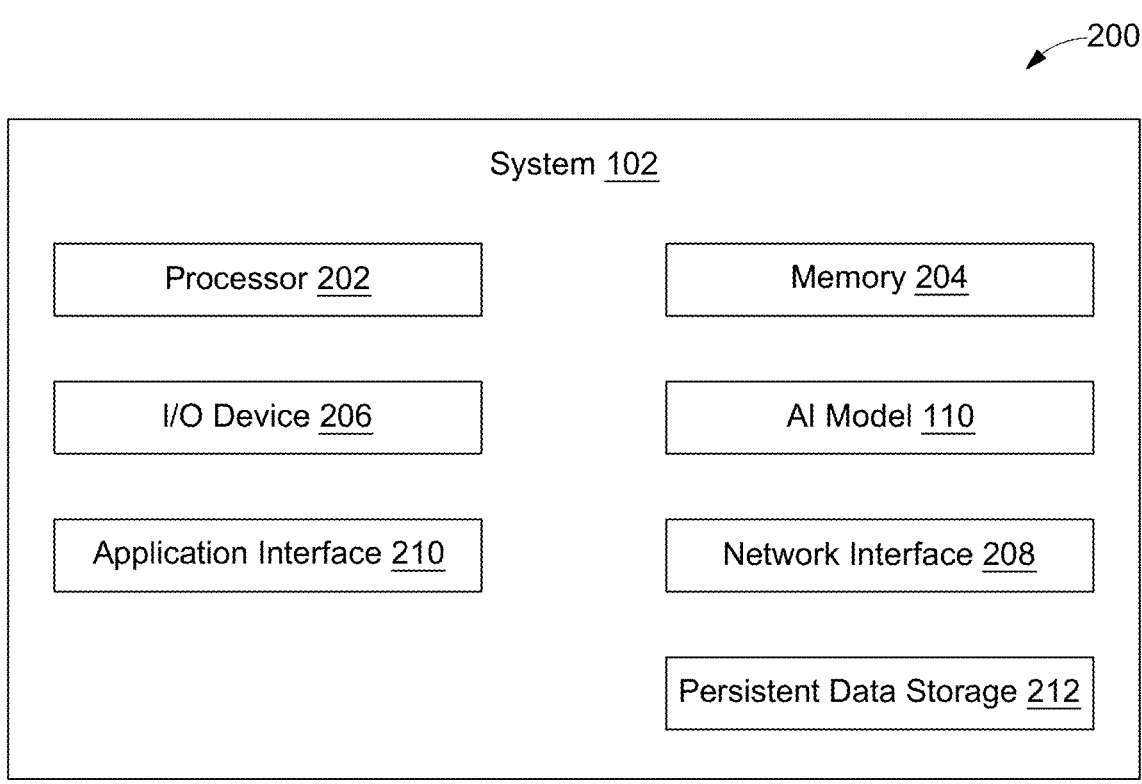
FIG. 2 is a block diagram of a system for analyzing images and generating a report is illustrated, in accordance with an embodiment of the disclosure.

Referring now to FIG. 2, a block diagram 200 of the system 102 is illustrated, in accordance with embodiment of the present disclosure. The system 102 may include a processor 202, a memory 204, an input/output (I/O) device 206, a network interface 208, an application interface 210, and a persistent data storage 212. The system 102 may also include the AI model 110, as part of, for example, a software application for generating a report by a report generating model based on the raw report. The processor 202 may be communicatively coupled to the memory 204, the I/O device 206, the network interface 208, the application interface 210, and the persistent data storage 212. In one or more embodiments, the system 102 may also include a provision/functionality to store images.

The processor 202 may include suitable logic, circuitry, interfaces, and/or code that may be configured to analyze the test images. The processor 202 may be implemented based on a number of processor technologies, which may be known to one ordinarily skilled in the art. Examples of implementations of the processor 202 may be a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, Artificial Intelligence (AI) accelerator chips, a co-processor, a central processing unit (CPU), and/or a combination thereof.

The memory 204 may include suitable logic, circuitry, and/or interfaces that may be configured to store instructions executable by the processor 202. Additionally, the memory 204 may be configured to store program code of the AI model 110 and/or the software application that may incorporate the program code of the AI model 110. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, and/or interfaces that may be configured to act as an I/O interface between a user and the system 102. The user may include a general practitioner or a radiologist who operates the system 102 for performing a screening test of a patient, or a patient who undergoes a screening test for anomaly detection. The I/O device 206 may include various input and output devices, which may be configured to communicate with different operational components of the system 102. Examples of the I/O device 206 may include, but are not limited to, a touch screen, a keyboard, a mouse, a joystick, a microphone, and a display screen.

The network interface 208 may include suitable logic, circuitry, interfaces, and/or code that may be configured to facilitate different components of the system 102 to communicate with other devices, such as the external device 106, in the environment 100, via the communication network 108. The network interface 208 may be configured to implement known technologies to support wired or wireless communication. Components of the network interface 208 may include, but are not limited to an antenna, a radio frequency (RF) transceiver, one or more amplifiers, a tuner, one or more oscillators, a digital signal processor, a coder-decoder (CODEC) chipset, an identity module, and/or a local buffer.

The network interface 208 may be configured to communicate via offline and online wireless communication with networks, such as the Internet, an Intranet, and/or a wireless network, such as a cellular telephone network, a wireless local area network (WLAN), personal area network, and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), code division multiple access (CDMA), LTE, time division multiple access (TDMA), Bluetooth, Wireless Fidelity (Wi-Fi) (such as IEEE 802.11, IEEE 802.11b, IEEE 802.11g, IEEE 802.11n, and/or any other IEEE 802.11 protocol), voice over Internet Protocol (VoIP), Wi-MAX, Internet-of-Things (IoT) technology, Machine-Type-Communication (MTC) technology, a protocol for email, instant messaging, and/or Short Message Service (SMS).

The application interface 210 may be configured as a medium for the user to interact with the system 102. The application interface 210 may be configured to have a dynamic interface that may change in accordance with preferences set by the user and configuration of the system 102. In some embodiments, the application interface 210 may correspond to a user interface of one or more applications installed on the system 102.

The persistent data storage 212 may include suitable logic, circuitry, and/or interfaces that may be configured to store program instructions executable by the processor 202, operating systems, and/or application-specific information, such as logs and application-specific databases. The persistent data storage 212 may include a computer-readable storage media for carrying or having computer-executable instructions or data structures stored thereon. Such computer-readable storage media may include any available media that may be accessed by a general-purpose or special-purpose computer, such as the processor 202.

By way of example, and not limitation, such computer-readable storage media may include tangible or non-transitory computer-readable storage media including, but not limited to, Compact Disc Read-Only Memory (CD-ROM) or other optical disk storage, magnetic disk storage or other magnetic storage devices (e.g., Hard-Disk Drive (HDD)), flash memory devices (e.g., Solid State Drive (SSD), Secure Digital (SD) card, other solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media.

Computer-executable instructions may include, for example, instructions and data configured to cause the processor 202 to perform a certain operation or a set of operations associated with the system 102. The functions or operations executed by the system 102, as described in FIG. 1, may be performed by the processor 202.

The data repository may be configured to store information that is required for processing in run time. Such information may include X-ray radiographs, predicted classes, dataset of training images, dataset of test images, raw reports and reports generated by the report generating model. The data repository may correspond to a high-speed data repository, such as, but not limited to, Redis, and NoSQL.

In an embodiment, the system 102 may be configured to receive input data. The input data may include an X-ray image and a raw report (i.e., a diagnostic report manually prepared by a radiologist). For example, the input data may be received from the database 104 of Digital Imaging and Communications in Medicine (DICOM) images and the raw reports. The system 102 may be configured to indicate abnormalities in at least one of a plurality of regions associated with the test X-ray image, based on a hierarchical classification by the AI model. Further, the system 102 may be configured to generate a clinically and grammatically accurate report corresponding to the detected abnormalities using NLP model. An output data (i.e., the clinically and grammatically accurate report) may be generated and presented to the user through user interface. The output may include at least one textual sentence.

In order to perform the above functionalities, the AI model 110 may be first trained to detect (i.e., classify) the abnormalities in the X-ray image, and prepare the clinically and grammatically accurate report. As such, the AI model 110 may be trained using a large data set which may include a number X-ray images and their corresponding reports prepared by the radiologists. However, the reports prepared by the radiologists may not be in a standardized format and may include grammatical errors that may lead to inaccurate or sub-standard outputs from the AI model 110. To this end, the AI model 110 may be trained with pre-processed reports. The pre-processing may include converting the reports into a standardized format and having standardized nomenclature (i.e., replacing certain terms and sentences with more recognized terms and sentences). The pre-processing may further include removing any technical or grammatically errors in the report. In particular, the pre-processing may include finding abnormalities present in the raw report using a deep learning model. Furthermore, the pre-processing may include generating grammatically correct report summaries for each abnormality using another deep learning model.

The abnormalities may be detected based on a hierarchical classification. As such, the abnormalities may be narrowed down in a hierarchical manner to a specific finding. The hierarchical approach may highlight the region on which the abnormalities are present, and bring them to the radiologist's attention. By taking into consideration the regions in which the abnormalities are present, the hierarchical approach improves accuracy of the classification. It should be noted that the classification may be based on a probabilistic approach rather than a deterministic approach.

Figure 3:
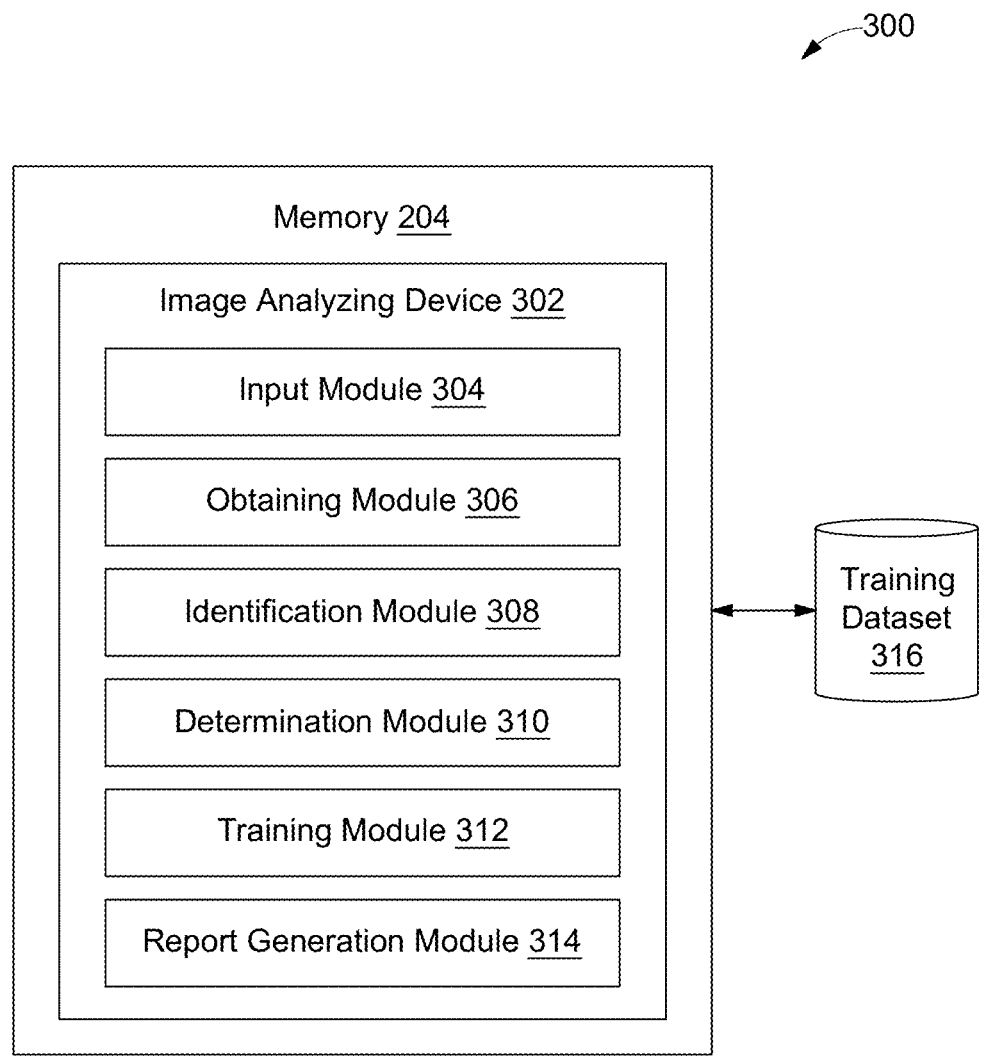
FIG. 3 is a functional block diagram that illustrates various modules of an image analyzing device for analyzing images and generating a report, in accordance with an embodiment of the disclosure.

Referring now to FIG. 3, a functional block diagram 300 of an image analyzing device 302 that illustrates various modules within a memory 204 of a system 102 for analyzing images and generating a report, in accordance with an embodiment of the disclosure. The image analyzing device 302 may include an input module 304, an obtaining module 306, an identification module 308, a determination module 310, a training module 312, a report generation module 314, and a training dataset 316.

The input module 304 of the image analyzing device 302 may be configured to input a test image to a trained prediction model. The prediction model may be a deep learning-based model. The test image may correspond to, but not limited to, X-ray radiographs, Computed Tomography (CT) scans, and Magnetic Resonance Imaging (MRI) scans.

Once the test image is inputted to the trained prediction model, at least one abnormality associated with the test image may be obtained using the trained prediction model via the obtaining module 306. Based on the at least one abnormality, the identification module 308 may identify at least one relevant predetermined region from a plurality of predetermined regions associated with the test image, using the trained prediction model. It may be noted that each of the at least one relevant predetermined region is identified based on hierarchical classification. In accordance with an embodiment, the hierarchical classification may include classifying each of the at least one abnormality associated with the at least one relevant predetermined region into a plurality of classes. It should be noted that each of the plurality of classes may include a set of related abnormalities.

Once the at least one relevant predetermined region is identified, the determination module 310 may determine a location associated with the at least one abnormality within each of the at least one relevant predetermined region. In some embodiments, based on the at least one identified abnormality and the location associated with the at least one abnormality, the image analyzing device 302 may obtain a report for each of the at least one relevant predetermined region, from a trained report generating model. The report generating model may be another deep learning-based model.

In some embodiment embodiments, the training module 312 may be configured to train the prediction model and the report generating model using a training dataset 316. The training dataset 316 may include a plurality of training images and a report (i.e., a raw report or a diagnostic report manually prepared by a radiologist) corresponding to each of the plurality of training images.

For training the prediction model and the report generating model, the training module 312 may analyze each of a plurality of diagnostic reports, based on one or more tokens, to: identify one or more keywords matching with each of the one or more tokens, based on a Location Synonym Map (LSM), identify an abnormality, associated with the diagnostic report, and generate at least one sentence, using the one or more keywords. It should be noted that the diagnostic report may be in an unstructured format, and the one or more tokens may be retrieved from a domain knowledge database. Once each of a plurality of diagnostic reports are analyzed, the training module 312 may further categorize a plurality of abnormalities associated with the plurality of diagnostic reports into the at least one predetermined region within the image, corresponding to each of the plurality of abnormalities, to obtain a structured report. The structured report may be in a structured format. The process of converting the diagnostic report from unstructured format into structured format is explained in detail in conjunction with FIG. 4. In some embodiments, the report generating model trained using the training dataset 316 may include the one or more keywords, the identified abnormality associated with the report, and the at least one sentence, and the structured report.

Further, the report generation module 314 may generate a report corresponding to the location associated with each of the at least one abnormality for each of the at least one relevant predetermined region. In some embodiments, the report generation module 314 may generate the report by inputting each of the at least one abnormality, latent embeddings associated with image, and the location associated with each of at least one abnormality to the trained report generating model, and then receiving a report for the abnormality from the report generation model. It may be noted that the report generating model may be trained based on a Radiological Finding Quality Index (RFQI) loss with LSM loss. The generated report may be a clinically and grammatically accurate report that may be further rendered to the user.

It should be noted that all such aforementioned modules 304-314 may be represented as a single module or a combination of different modules. Further, as will be appreciated by those skilled in the art, each of the modules 304-314 may reside, in whole or in parts, on one device or multiple devices in communication with each other. In some embodiments, each of the modules 304-314 may be implemented as dedicated hardware circuit comprising custom application-specific integrated circuit (ASIC) or gate arrays, off-the-shelf semiconductors such as logic chips, transistors, or other discrete components. Each of the modules 304-314 may also be implemented in a programmable hardware device such as a field programmable gate array (FPGA), programmable array logic, programmable logic device, and so forth. Alternatively, each of the modules 304-314 may be implemented in software for execution by various types of processors (e.g., processor 202). An identified module of executable code may, for instance, include one or more physical or logical blocks of computer instructions, which may, for instance, be organized as an object, procedure, function, or other construct. Nevertheless, the executables of an identified module or component need not be physically located together, but may include disparate instructions stored in different locations which, when joined logically together, include the module and achieve the stated purpose of the module. Indeed, a module of executable code could be a single instruction, or many instructions, and may even be distributed over several different code segments, among different applications, and across several memory devices.

As will be appreciated by one skilled in the art, a variety of processes may be employed for analyzing images and generating a report. For example, the system 102 and the associated image analyzing device 302 may analyze images and generating the report by the processes discussed herein. In particular, as will be appreciated by those of ordinary skill in the art, control logic and/or automated routines for performing the techniques and steps described herein may be implemented by the system 100 and the associated image analyzing device 302 either by hardware, software, or combinations of hardware and software. For example, suitable code may be accessed and executed by the one or more processors on the system 102 to perform some or all of the techniques described herein. Similarly, application specific integrated circuits (ASICs) configured to perform some or all of the processes described herein may be included in the one or more processors on the system 102.

Figure 4:
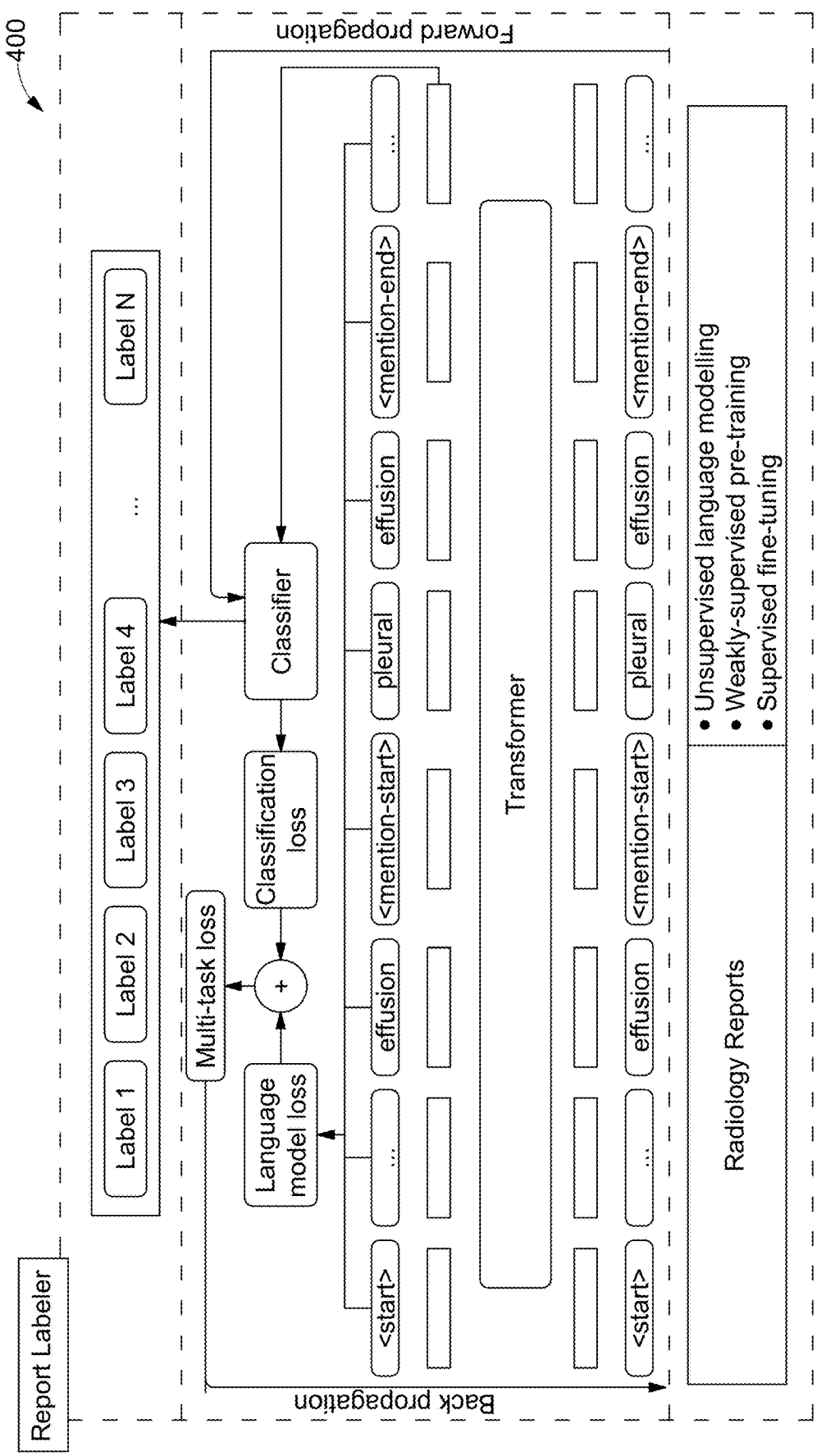
FIG. 4 illustrates a schematic diagram of a system for converting unstructured data into structured data, in accordance with an embodiment of the present disclosure.

Referring now to FIG. 4, a schematic diagram of a system 400 for converting unstructured data into structured data, is illustrated, in accordance with an embodiment of the present disclosure. With reference to FIG. 4, a diagnostic report for example, a raw report corresponding to the X-ray image prepared by a radiologist may be input to the system 400.

Input data (i.e., the report) may be indicative of an abnormality detected in the X-ray image. In accordance with an embodiment, the system 400 may be configured to pre-process the input data. The pre-processing may include cleaning the data, and in particular, converting at least one textual sentence from the report into a format that the AI model (also, interchangeably referred to as AI model or deep learning model in this disclosure) is able to understand.

The above techniques provide for a new format which has several advantages. It should be noted that the system 400 is able to first find all the synonyms of each abnormality (for example, "collapse" is a synonym of "Atelectasis"). Thereafter, after each occurrence of "collapse", a token sequence <mention-start> Atelectasis <mention-end> is inserted. It should be further noted that since the model is being trained with language model loss, the model is able to identify the presence or absence of "Atelectasis", as well as predict that "collapse" is a synonym of "Atelectasis" (since it is trained to predict the next word when given the current word as input). Further, if a new synonym for "Atelectasis" is found which the model has not encountered during training, following tokens mention-start> Atelectasis <mention-end> will allow the model to correctly infer that this sentence pertains to "Atelectasis" and not some new abnormality. As such, prior domain knowledge is easily included.

The pre-processing (i.e., data cleaning) may use a multi-tasks loss function combined with language model loss and classification loss to train the AI model in order to obtain a list of abnormalities present in each report, which is further used as input, along with the raw report to another AI model which generates clean grammatical sentences for each finding or abnormality that is present. The pre-processing operation on the at least one textual sentence may include, but is not limited to, a sentence extraction, a sentence cleanup, and a spell correction.

The data pre-processing operation may be based on multi-tasks loss combining language model loss and classification loss to train the model. In some embodiments, after sentence formatting (by using the data processing operations), the processed input data may be fed to a report labeler. In some embodiments, mention/synonyms group may be prepared for each findings using domain knowledge. The reports may be scanned for each token using the mention/synonyms group. The corresponding sentences of each synonyms-findings may be found and further fed to the AI model in order to obtain a list of abnormalities (both positive and negative). It should be noted that custom input formats may be created for each finding to feed the model (contextual sentence for each finding). Also, complete reports and abnormalities may be included in the input. The above-mentioned method may generate abnormalities/findings-specific sentences, which will be grouped together to generate structured reports (from unstructured reports), and may further be used to train a classification and report generation model.

A multi-label text classification operation may be performed. In accordance with an embodiment, in the multi-label text classification, the pre-processed input data may be classified into one or more than one class, and as such labels (or tags) may be assigned. It should be noted that multi labels i.e. non-exclusive labels may be assigned. In other words, the system 400 may to classify the text (the at least one sentence) with one label (one class), or it may classify it in to one or more than one class. The classified input data may correspond to radiological findings label.

Figure 5:
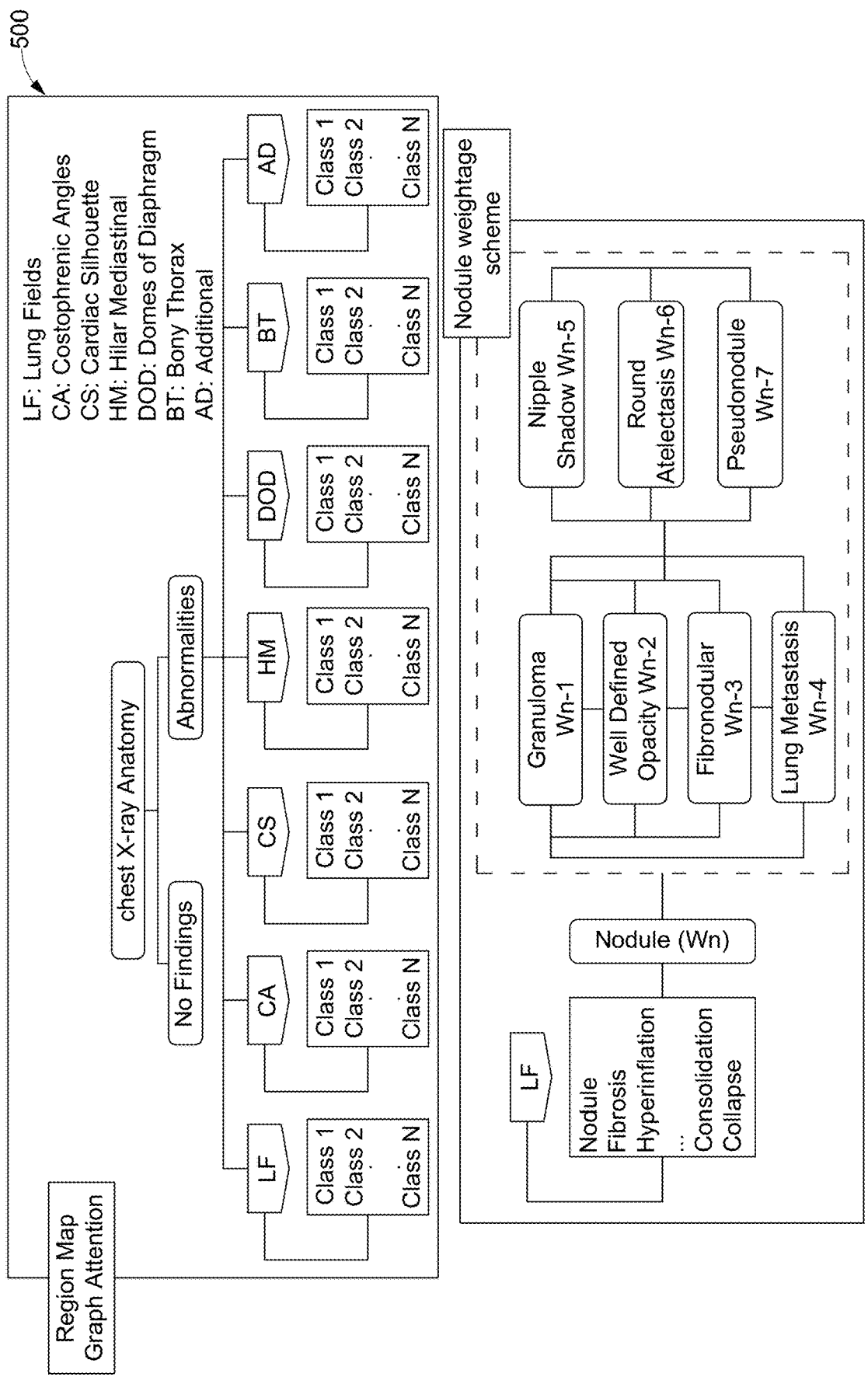
FIG. 5 illustrates a schematic diagram of an example process flow of implementing a graph attention network, in accordance with an embodiment of the present disclosure.

Referring now to FIG. 5, a schematic diagram of an example process flow 500 of implementing a graph attention network (i.e., a region graph attention mechanism) is illustrated in accordance with an embodiment. In some embodiments, as shown in FIG. 5, region graph attention models may be created with different regions. For example, the regions for a Chest X-ray may include a Lung Field (LF), a Costophrenic Angle (CP), a Cardiac Silhouette (CS), a Hilar Mediastinal (HM), a Dome of Diaphragm (DOD), a Bony Thorax (BT), and an Additional (AD). Each region may be mapped with the corresponding finding.

Further, each finding may be mapped with corresponding synonyms to prepare a graph attention weight mechanism. In an embodiment, the findings may be divided into different regions based on mapping and each finding's synonyms may relate to the weightage scheme. For example weights (Wn=Wn-1, Wn-2 . . . Wn-m) may be assigned to different possible findings like granuloma (Wn-1), well-defined opacity (Wn-2), fibronodular (Wn-3), lung metastasis (Wn-4), nipple shadow (Wn-5), round atelectasis (Wn-6), pseudonodule (Wn-7). The weightage scheme may contribute to the model training simultaneously. The weights may be assigned to each finding based on the occurrence of synonyms (the lower the occurrence, the lower the weight). Accordingly, each of the possible findings, i.e. the Lung Field (LF), the Costophrenic Angle (CP), the Cardiac Silhouette (CS), the Hilar Mediastinal (HM), the Dome of Diaphragm (DOD), the Bony Thorax (BT), and the Additional (AD) may be classified, based on N classifications. Finally, based on the classification, a most probable finding or abnormality may be determined.

Figure 6A:
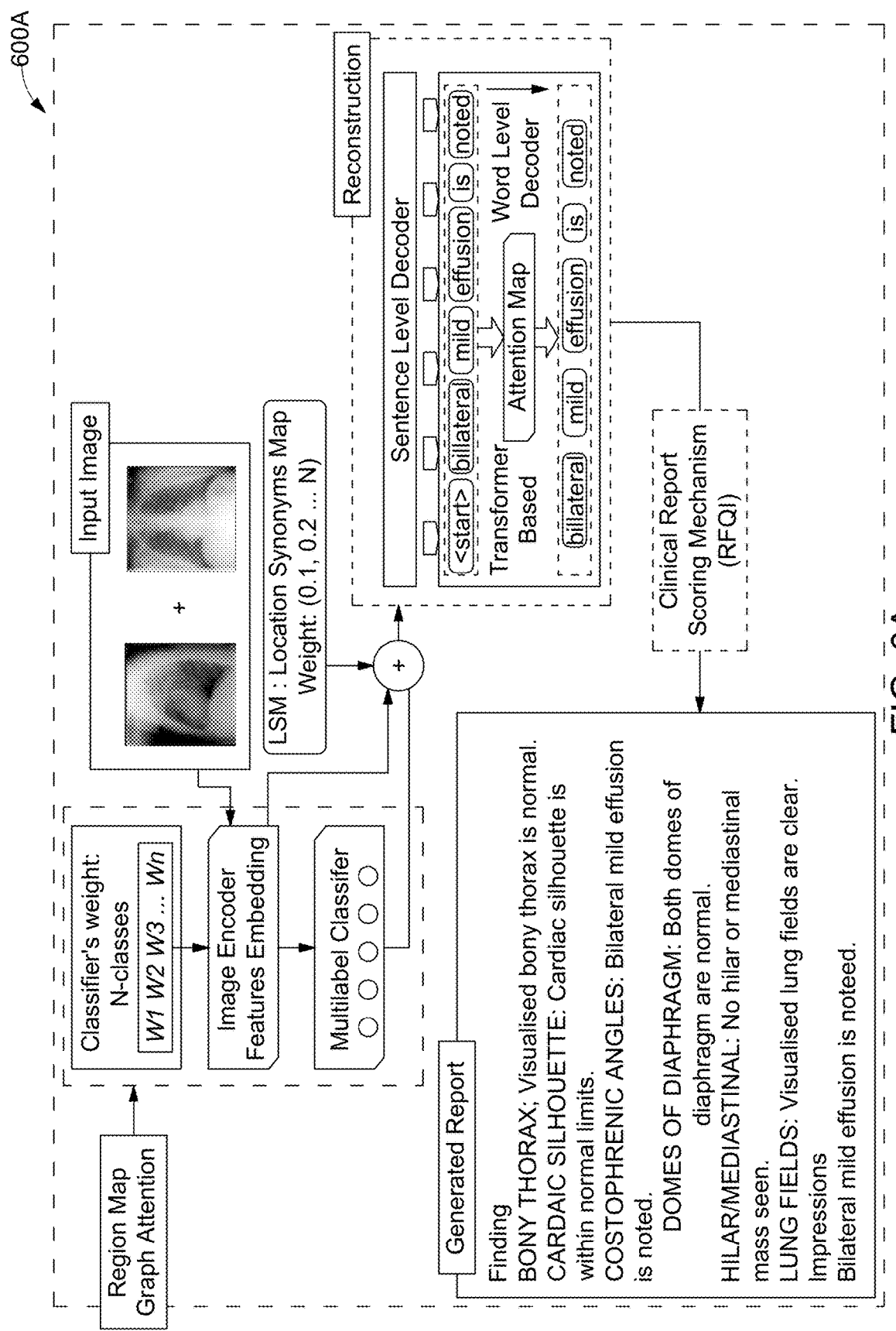
FIG. 6A illustrates a schematic diagram of a multitasking learning framework, in accordance with an embodiment of the present disclosure.

Referring now to FIG. 6A, a schematic diagram of a multitasking learning framework 600A is illustrated, in accordance with an embodiment. The multitasking learning framework 600A may be used to generate a technically and grammatically accurate report for the identified abnormalities. As will be appreciated, loss functions may be created by combining classification loss and region loss. A new loss function may be derived based on the location synonym map (LSM). The LSM may be prepared using region wise occurrence of findings-synonyms mapping. Further, location synonym mapping weight may be combined with classification loss and feature embedding. In addition, LSM loss may be prepared to train the report generation model.

For example, the findings from the raw report (also referred to as ground truth) may include "BONY THORAX: Visualised bony thorax is normal"; "CARDIAC SILHOUETTE: Cardiac silhouette is within normal limits", "COSTOPHRENIC ANGLES: Bilateral mild effusion is noted", "DOMES OF DIAPHRAGM: Both domes of diaphragm are normal", "HILAR/MEDIASTINAL: No hilar or mediastinal mass seen", "LUNG FIELDS: Visualized lung fields are clear", and "Impressions: Bilateral mild effusion is noted". These findings may be correlated with various regions in the X-ray image (input image). An example Location Synonyms Map (LSM) 600B for an abnormality of consolidation is illustrated in FIG. 6B.

Figure 6B:
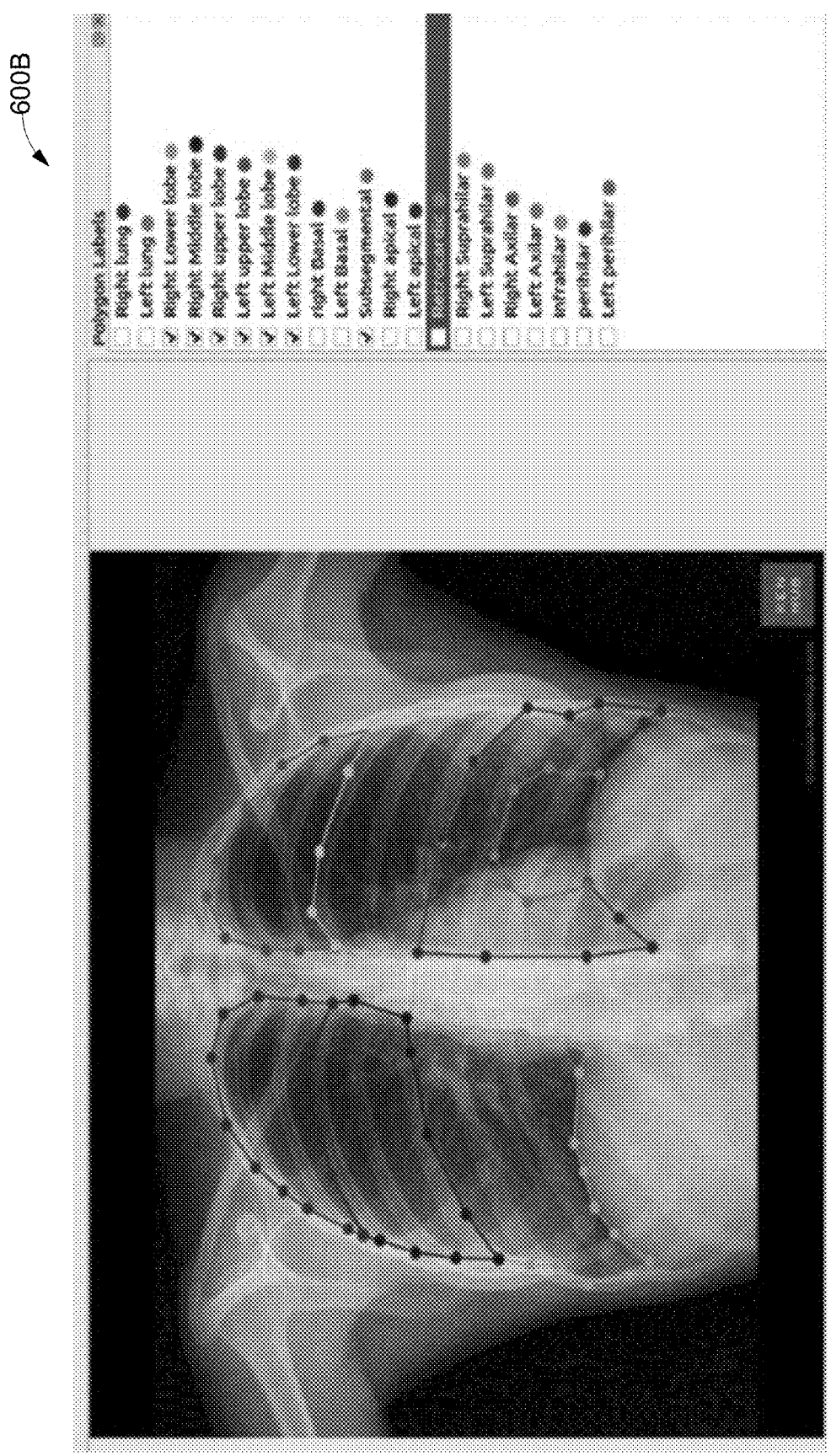
FIG. 6B illustrates an example Location Synonyms Map (LSM) for an abnormality of consolidation, in accordance with an embodiment of the present disclosure.

With reference to FIG. 6B, an exemplary chest X-ray image is depicted. The exemplary chest X-ray image may indicate one or more localization i.e., location of a set of abnormalities within the at least one relevant predetermined region. It may be noted that the one or more localization may be created on the exemplary chest X-ray image based on analyzing the diagnostic or raw report and/or classification of each of the at least one abnormality associated with the at least one relevant predetermined region into a plurality of classes using the trained AI model. The diagnostic report corresponding to the exemplary chest X-ray image may be manually provided by the radiologist. Further, the diagnostic or raw report may be pre-processed to convert the unstructured text to more structured text, and the pre-processed report may be used to train the AI model. Furthermore, a report prepared by the trained AI model may be obtained based on the analysis of the chest X-ray image. This report prepared by the trained AI model may be compared with the raw report to determine the accuracy of the AI model in generating the reports. To generate more clinically and grammatically accurate reports, with more similar sentences as radiologists, a Radiological Finding Quality Index (RFQI) may be calculated and a RFQI loss may be combined with LSM loss. This is further illustrated in FIG. 7.

Figure 7:
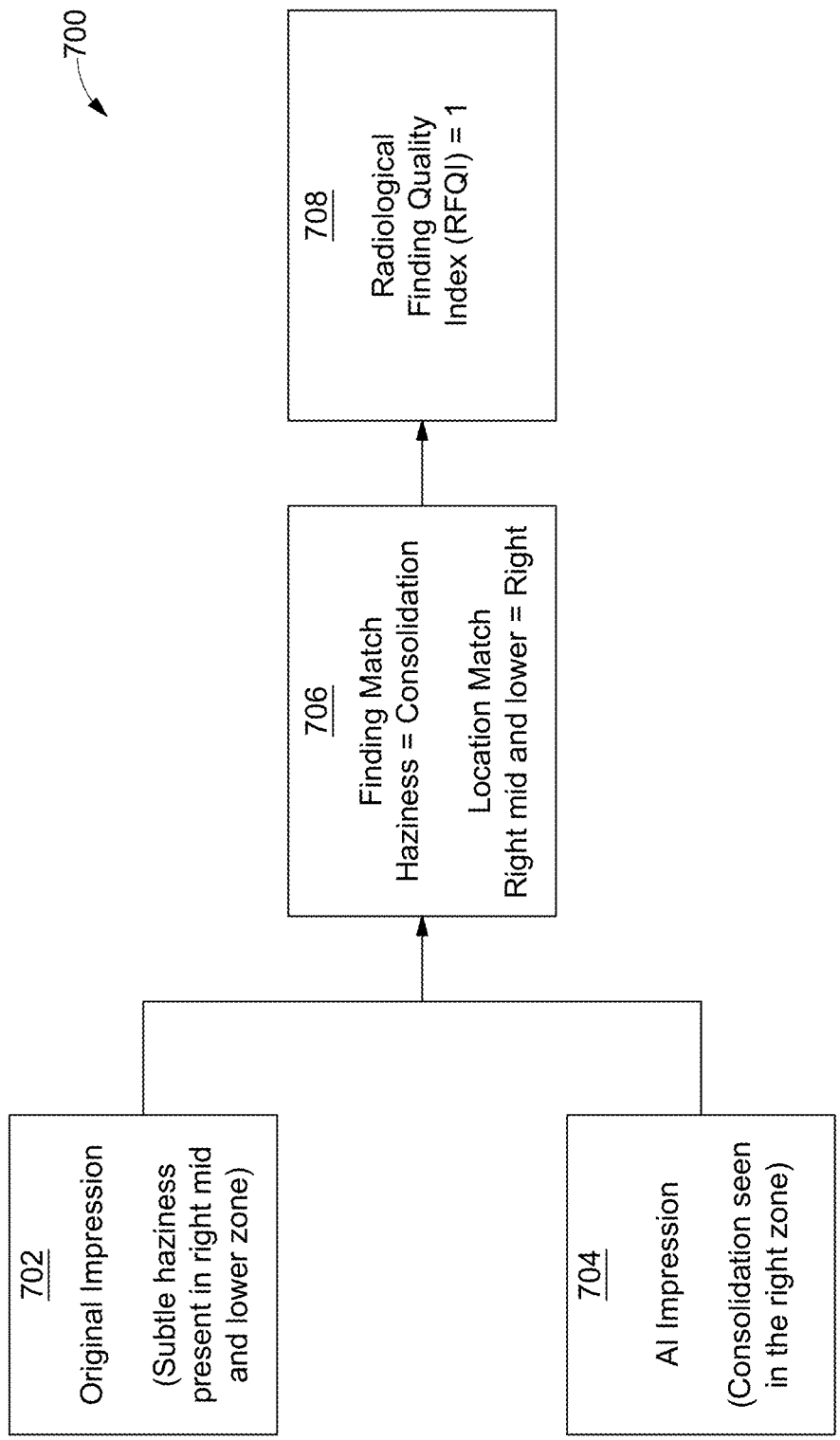
FIG. 7 illustrates a process that shows an exemplary scenario for scoring operation in a system, in accordance with an embodiment of the present disclosure.

Referring now to FIG. 7, a process flow diagram 700 that shows an exemplary scenario for scoring operation in a system is illustrated, in accordance with an embodiment of the present disclosure. In accordance with an embodiment, an original impression 702 of an image associated with a subject may have visual indicators that may highlight a region of interest specifically. The original impression 702 may correspond to ground truth data, for example, inference provided by a medical practitioner/doctor based on their study of the one or more images associated with a subject. In the example scenario, as shown in FIG. 7, the original impression 702 is "Subtle haziness present in right mid and lower zone". The region of interest may be indicative of a location of a body part/organ where an anomaly may be present. For example, subtle haziness (anomaly) present in the right mid and lower zone (location) of the body part/organ.

Further, an AI impression 704 is the inference/prediction generated by the AI model 110 corresponding to the same image associated with the subject. For example, as shown in FIG. 7, the AI impression 704 is "Consolidation seen in the right zone". As it will be noted, the AI impression 704 generated by the AI model 110 may not be exactly same as the original impression 702 provided by the medical practitioner/doctor based on the study of the images associated with the subject.

Thereafter, the original impression tokens may be compared with corresponding AI impression tokens to determine a degree of match. To this end, first, the original impression 702 may be tokenized to generate original impression tokens, such as "haziness", "right", "mid", and "lower". Similarly, the AI impression 704 may be tokenized to generate AI impression tokens, such as "consolidation" and "right". Thereafter, the original impression tokens may be categorized into a "finding" category and a "location" category. For example, in this case, the token "haziness" is categorized in the "finding" category and a set of tokens "right", "mid", and "lower" are categorized in the "location" category. Further, the AI impression tokens may be categorized into the "finding" category and the "location" category. For example, in this case, the token "consolidation" is categorized in the "finding" category and the token "right" is categorized in the "location" category.

In accordance with an embodiment, each of the tokens or the sets of original impression tokens may be compared with a corresponding token or set of AI impression tokens, and assign a match score 706 to each set of the one or more sets of original impression tokens based on the comparison. The match score 706 may be indicative of the degree of match between the original impression 702 and the AI impression 704. In accordance with an embodiment, "haziness" from the original impression 702 may be equivalent to "consolidation" of the AI impression 704. In accordance with an embodiment, localization may be performed by the system 102 by identifying a location of the region of interest in the image. Based on the localization, the location match for "right mid and lower zone" from the original impression 702 may be equivalent to "right zone" of the AI impression 704. The match score may be referred as Radiological Finding Quality Index (RFQI) 708. In this example, as shown in FIG. 7, there is high degree of match between each of the original impression tokens or the sets of original impression tokens and corresponding AI impression tokens or the set of AI impression tokens. As such, a combined match score of "1" is assigned to the AI impression 704.

Figure 8:
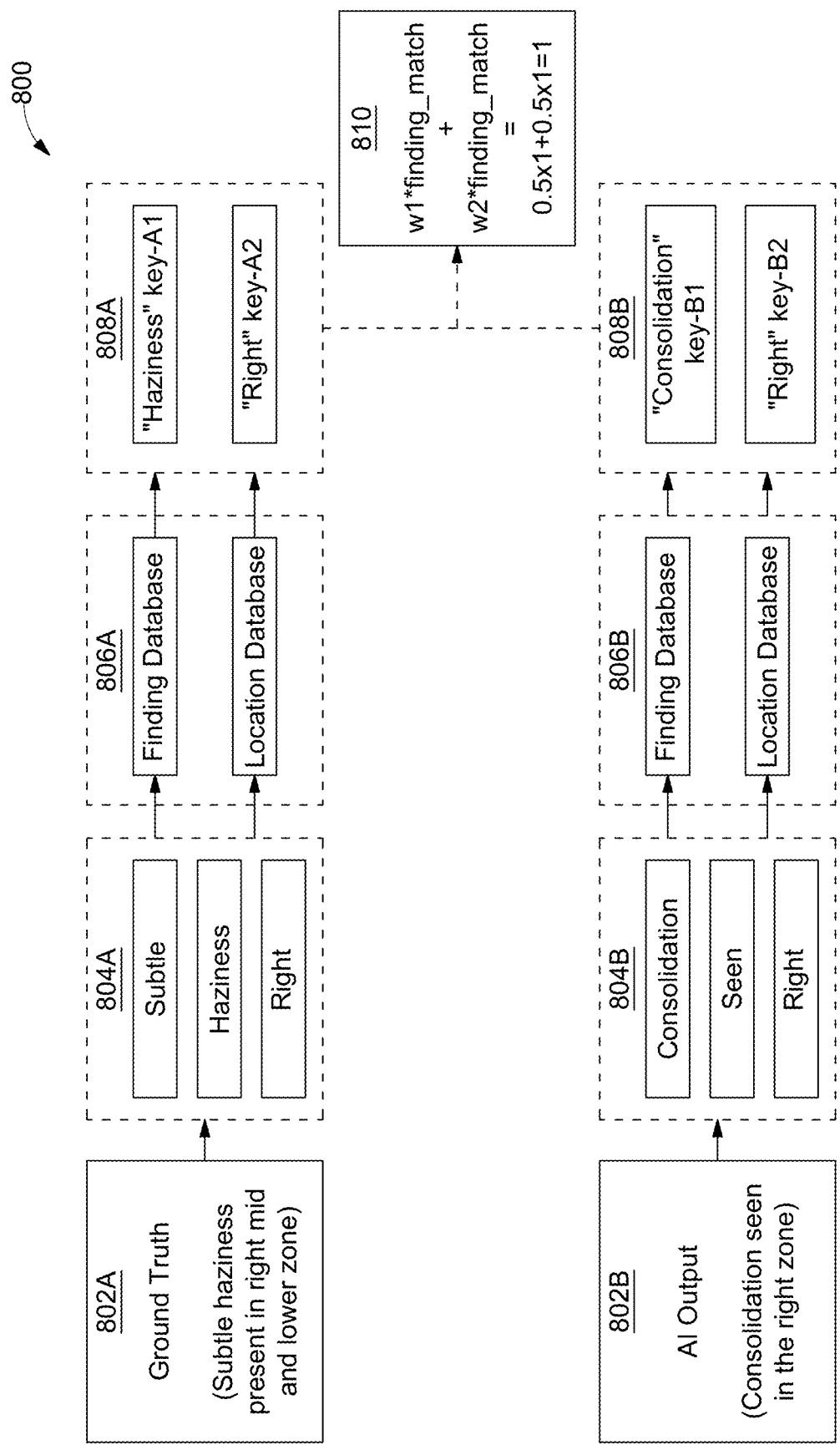
FIG. 8 illustrates another process flow diagram that shows an exemplary scenario for scoring operation in a system, in accordance with an embodiment of the disclosure.

Referring now to FIG. 8, another process flow diagram 800 that shows an exemplary scenario for scoring operation in a system is illustrated, in accordance with an embodiment of the present disclosure. A ground truth 802A (corresponding to original impression 702) of an image associated with a subject is received. Further, an AI output 802B (corresponding to AI impression 704) is received. Thereafter, the ground truth 802A may be tokenized to generate ground truth tokens 804A, such as "subtle," "haziness" and "right". The AI output 802B may be tokenized to generate AI output tokens 804B, such as "consolidation", "seen", and "right".

Further, the ground truth tokens "subtle", and "haziness" may be categorized in the "finding" category, upon referencing a database 806A (in particular, a finding database). The ground truth token "right" may be categorized in the "location" category, upon referencing the database 806A (in particular, a location database). In some embodiments, a key 808A may be selected from each of the "finding" category and the "location" category. For example, "haziness" may be selected as key-A1 and "right' may be selected as key-A2.

Similarly, AI output tokens "consolidation" and "seen" may be categorized in the "finding" category, based on referencing with a database 806B (in particular, a finding database). The AI output token "right" may be categorized in the "location" category, based on referencing with the database 806B (in particular, a location database). Further, a key 808B may be selected from each of the "finding" category and the "location" category. For example, "consolidation" may be selected as key-B1 and "right' may be selected as key-B2.

A combined match score 810 may be calculated. To this end, an individual match score may be assigned to each of the keys—key-B1 and key-B2-based on their comparison with the key-A1 and key-A2, respectively, and further based on the degree of match. For example, a highest match score approximately of 0.5 may be assigned to each the keys key-B1 and key-B2 in case of high degree of match. As such, in the current example, the key-B1 and key-B2 may be assigned the highest match score of 0.5 due to high degree of match. As it will be understood, the key B1 ("consolidation") essentially matches with the key A1 ("haziness"). Similarly, the key B2 ("right") also exactly matches with the key A2 ("right"). The combined match score 810 is calculated as a sum of the individual match scores assigned to each of the keys key-B1 and key-B2, i.e., 0.5+0.5=1, indicating a high degree of match. Therefore, as being closely matching with the ground truth, the generation module 314 may be configured to generate more clinically and grammatically accurate reports, with more similar sentences as radiologists that may further be rendered on a user device.

Figure 9:
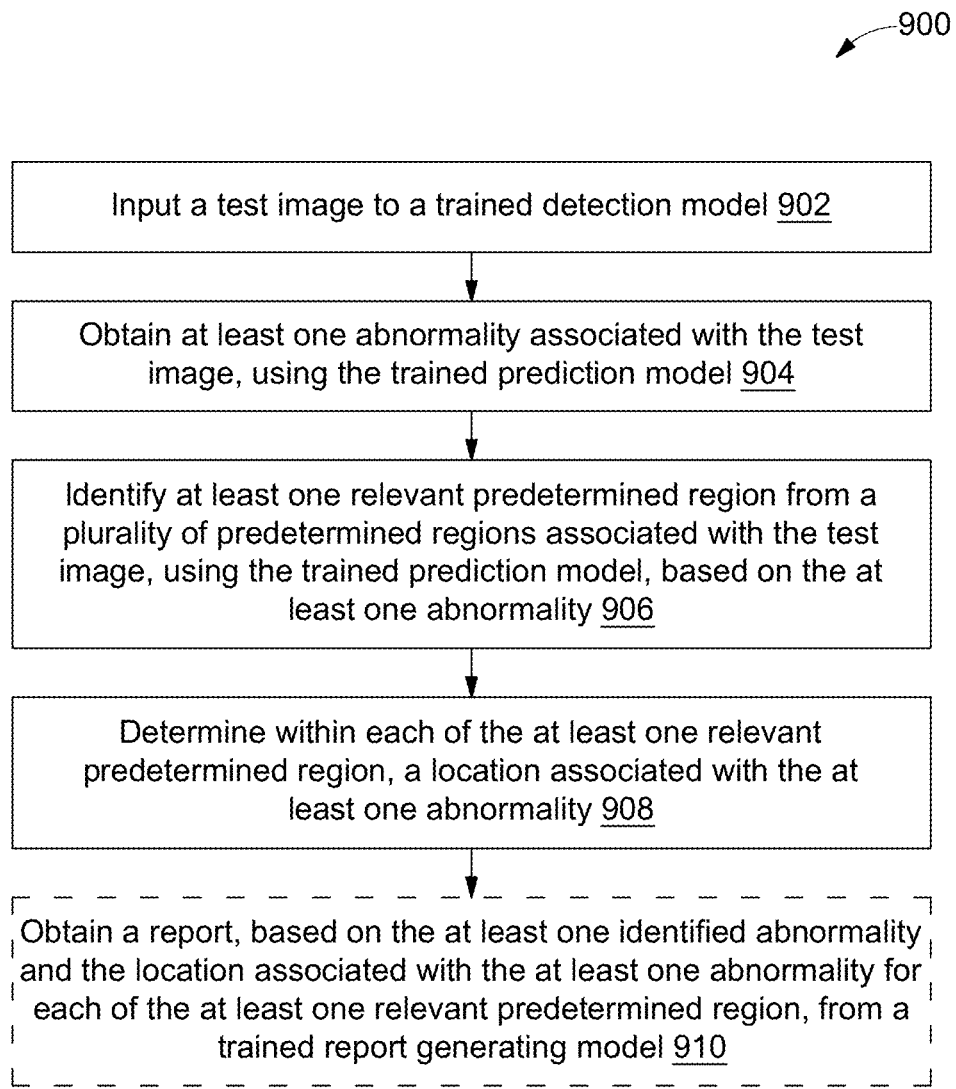
FIG. 9 is a flowchart of a method for analyzing images and generating a report, in accordance with an embodiment of the disclosure.

Referring now to FIG. 9, a flowchart of a method 900 for analyzing test images (i.e., X-Ray images) and generating a report is illustrated, in accordance with an embodiment. At step 902, a test image may input to a trained prediction model. The trained prediction model may be a deep learning-based model. At step 904, at least one abnormality associated with the test image may be obtained using the trained prediction model.

Based on the at least one abnormality at step 906, at least one relevant predetermined region from a plurality of predetermined regions associated with the test image may be identified, using the trained prediction model. It may be noted that each of the at least one relevant predetermined region is identified based on hierarchical classification. Once the least one relevant predetermined region is identified, then at step 908, a location associated with the at least one abnormality may be determined within each of the at least one relevant predetermined region.

In some embodiments, the identification of each of the at least one relevant predetermined region based on the hierarchical classification may include classifying each of the at least one abnormality associated with the at least one relevant predetermined region into a plurality of classes. The plurality of classes may be, for example, a Lung Field (LF) class, a Costophrenic Angle (CP) class, a Cardiac Silhouette (CS) class, a Hilar Mediastinal (HM) class, a Dome of Diaphragm (DOD) class, a Bony Thorax (BT) class, and an Additional (AD) class. It may be noted that each of the plurality of classes may include a set of related abnormalities. It may also be noted that for classifying each of the at least one abnormality into respective classes, a plurality of trained AI models may be used. For example, in case of a Chest X-ray if the detected at least one abnormality is related to lungs, then the at least one abnormality may be placed into the class of the LF using an AI model that may be trained only for detecting abnormality related to the LF region. Likewise, if the detected at least one abnormality is related to cardiac, then the at least one abnormality may be placed into the class of CS using another type of AI model that may be trained only for detecting abnormality related to CS region. In a similar manner, each of the at least one abnormality detected may be classified into one of the plurality of classes as described above in FIG. 9.

At step 910, a report based on the at least one identified abnormality and the location associated with the at least one abnormality may be obtained for each of the at least one relevant predetermined region, from a trained report generating model. The report generation model may be a deep learning-based model. As such, the method 900 may further include training the prediction model and the report generating model using a training dataset. The training dataset may include a plurality of training images and a diagnostic report corresponding to each of the plurality of training images.

The training may include analyzing each of a plurality of diagnostic reports, based on one or more tokens, to: identify one or more keywords matching with each of the one or more tokens based on a Location Synonym Map (LSM), identify an abnormality, associated with the diagnostic report, and generate at least one sentence, using the one or more keywords. It should be noted that each of the plurality of diagnostic reports may be in unstructured format, and the one or more tokens may be retrieved from a domain knowledge database. The training may further include categorizing a plurality of abnormalities associated with the plurality of diagnostic reports into the at least one predetermined region within the image, corresponding to each of the plurality of abnormalities, to obtain a structured report. In some embodiments, the structured report may be obtained by creating a plurality of region graphs for each of the at least one predetermined region within the training image, mapping each of the plurality of abnormalities with each of the at least one predetermined region, based on attention weights predicted using a Graph Attention model, and creating the structured report based on the mapping.

In some embodiments, the report may be obtained by inputting each of the at least one abnormality, latent embeddings associated with image, and the location associated with each of at least one abnormality to the trained report generating model, and then receiving the report for the abnormality from the report generation model. It may be noted that the report generating model may be trained based on a Radiological Finding Quality Index (RFQI) loss with LSM loss. The report generating model trained using the training dataset may include the one or more keywords, the identified abnormality associated with the report, and the at least one sentence, and the structured report. The generated report may be a clinically and grammatically accurate report that may be further rendered to a user device which aids in medical decision making.

The above disclosure provides for a framework to process raw report and detect the findings in the reports and produce the clean grammatically sentences for each finding from reports that will be further used to train the multilabel classification model and report generation model. Further, the above disclosure provides for learning as a multitask learning problem. To detect the abnormality in a hierarchical manner, each level narrows down the problem of detection and classification of abnormality, to thereby highlight the region on which the abnormalities are present and bring to the attention of the radiologist. A probabilistic approach rather than a deterministic approach is used. Furthermore, the above disclosure provides for a multi-task and active learning framework to produce a more clinically accurate report. By way of the above, performance competitive with benchmarks along with the flexibility of the system for future information inclusion is achieved without compromising the previous performance.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It will be appreciated that, for clarity purposes, the above description has described embodiments of the disclosure with reference to different functional units and processors. However, it will be apparent that any suitable distribution of functionality between different functional units, processors or domains may be used without detracting from the disclosure. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present disclosure has been described in connection with some embodiments, it is not intended to be limited to the specific form set forth herein. Rather, the scope of the present disclosure is limited only by the claims. Additionally, although a feature may appear to be described in connection with particular embodiments, one skilled in the art would recognize that various features of the described embodiments may be combined in accordance with the disclosure.

Furthermore, although individually listed, a plurality of means, elements or process steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

We claim:

1. A method of analyzing images and generating a report, the method comprising:
   inputting, by an image analyzing device, a test image to a trained prediction model, wherein the prediction model is a deep learning-based model;
   obtaining, by the image analyzing device, at least one abnormality associated with the test image, using the trained prediction model;
   identifying, by the image analyzing device, at least one relevant predetermined region from a plurality of predetermined regions associated with the test image, using the trained prediction model, based on the at least one abnormality, wherein each of the at least one relevant predetermined region is identified based on hierarchical classification; and
   determining, by the image analyzing device, within each of the at least one relevant predetermined region, a location associated with the at least one abnormality; and
   obtaining the report, based on the at least one identified abnormality and the location associated with the at least one abnormality for each of the at least one relevant predetermined region, from a trained report generating model, wherein the report generating model is a deep learning-based model, wherein obtaining the report comprises:
      inputting each of the at least one abnormality, latent embeddings associated with the test image, and the location associated with each of the at least one abnormality to the trained report generating model, wherein the report generating model is trained based on a Radiological Finding Quality Index (RFQI) loss with LSM loss; and
      receiving the report for the abnormality from the report generation model.

2. The method as claimed in claim 1 comprises:
   training the prediction model and the report generating model using a training dataset, wherein the training dataset comprises a plurality of training images and a diagnostic report corresponding to each of the plurality of training images.

3. The method as claimed in claim 1, wherein the training further comprises:
   analyzing each of a plurality of diagnostic reports, based on one or more tokens, to:
      identify one or more keywords matching with each of the one or more tokens, based on a Location Synonym Map (LSM);
      identify an abnormality, associated with the diagnostic report; and
      generate at least one sentence, using the one or more keywords,
         wherein each of the plurality of diagnostic reports is in unstructured format,
         wherein the one or more tokens are retrieved from a domain knowledge database; and
   categorizing a plurality of abnormalities associated with the plurality of diagnostic reports into the at least one predetermined region within the image, corresponding to each of the plurality of abnormalities, to obtain a structured report.

4. The method as claimed in claim 3, wherein obtaining the structured report comprises:
   creating a plurality of region graphs for each of the at least one predetermined region within the training image;
   mapping each of the plurality of abnormalities with each of the at least one predetermined region, based on attention weights predicted using a Graph Attention model; and
   creating the structured report, based on the mapping.

5. The method as claimed in claim 2, wherein the report generating model is trained using the training dataset comprising the one or more keywords, the identified abnormality associated with the report, and the at least one sentence, and the structured report.

6. The method as claimed in claim 1, wherein identifying each of the at least one relevant predetermined region based on the hierarchical classification comprises:
   classifying each of the at least one abnormality associated with the at least one relevant predetermined region into a plurality of classes, wherein each of the plurality of classes comprises a set of related abnormalities.

7. The method as claimed in claim 1, wherein the test image is one of a radiography image, an ultrasonography image, a Computed Tomography (CT) scan image, a Magnetic Resonance Imaging (MRI) image, and a radiation therapy image.

8. A system for analyzing images and generating a report, the system comprising:
   a processor; and
   a memory communicatively coupled to the processor, wherein the memory stores processor-executable instructions, which, on execution, causes the processor to:
      input a test image to a trained prediction model, wherein the prediction model is a deep learning-based model;
      obtain at least one abnormality associated with the test image, using the trained prediction model;
      identify at least one relevant predetermined region from a plurality of predetermined regions associated with the test image, using the trained prediction model, based on the at least one abnormality, wherein each of the at least one relevant predetermined region is identified based on hierarchical classification; and
      determine within each of the at least one relevant predetermined region, a location associated with the at least one abnormality; and
      obtain the report, based on the at least one identified abnormality and the location associated with the at least one abnormality for each of the at least one relevant predetermined region, from a trained report generating model, wherein the report generating model is a deep learning-based model, wherein to obtain the report the processor-executable instructions further cause the processor to:
  input each of the at least one abnormality, latent embeddings associated with image, and the location associated with each of the at least one abnormality to the trained report generating model, wherein the report generating model is trained based on a Radiological Finding Quality Index (RFQI) loss with LSM loss; and
  receive the report for the abnormality from the report generation model.

9. The system as claimed in claim 8, wherein the processor-executable instructions further cause the processor to train the prediction model and the report generating model using a training dataset, wherein the training dataset comprises a plurality of training images and a diagnostic report corresponding to each of the plurality of training images.

10. The system as claimed in claim 8, wherein to train the prediction model and the report generating model, the processor-executable instructions further cause the processor to:
  analyze each of a plurality of diagnostic reports, based on one or more tokens, to:
    identify one or more keywords matching with each of the one or more tokens, based on a Location Synonym Map (LSM);
    identify an abnormality, associated with the diagnostic report; and
    generate at least one sentence, using the one or more keywords,
      wherein each of the plurality of diagnostic reports is in unstructured format,
      wherein the one or more tokens are retrieved from a domain knowledge database; and
  categorize a plurality of abnormalities associated with the plurality of diagnostic reports into the at least one predetermined region within the image, corresponding to each of the plurality of abnormalities, to obtain a structured report.

11. The system as claimed in claim 10, wherein to obtain the structured report, the processor-executable instructions further cause the processor to:
  create a plurality of region graphs for each of the at least one predetermined region within the training image;
  map each of the plurality of abnormalities with each of the at least one predetermined region, based on attention weights predicted using a Graph Attention model; and
  create the structured report, based on the mapping.

12. The system as claimed in claim 9, wherein the report generating model is trained using the training dataset comprising the one or more keywords, the identified abnormality associated with the report, and the at least one sentence, and the structured report.

13. The system as claimed in claim 8, wherein to identify each of the at least one relevant predetermined region based on the hierarchical classification, the processor-executable instructions further cause the processor to:
  classify each of the at least one abnormality associated with the at least one relevant predetermined region into a plurality of classes, wherein each of the plurality of classes comprises a set of related abnormalities.

14. The system as claimed in claim 8, wherein the test image is one of a radiography image, an ultrasonography image, a Computed Tomography (CT) scan image, a Magnetic Resonance Imaging (MRI) image, and a radiation therapy image.

15. A computer program product for analyzing images and generating a report, the computer program product being embodied in a non-transitory computer readable storage medium of an image analyzing device and comprising computer instructions for:
  inputting, by an image analyzing device, a test image to a trained prediction model, wherein the prediction model is a deep learning-based model;
  obtaining, by the image analyzing device, at least one abnormality associated with the test image, using the trained prediction model;
  identifying, by the image analyzing device, at least one relevant predetermined region from a plurality of predetermined regions associated with the test image, using the trained prediction model, based on the at least one abnormality, wherein each of the at least one relevant predetermined region is identified based on hierarchical classification;
  determining, by the image analyzing device, within each of the at least one relevant predetermined region, a location associated with the at least one abnormality; and
  obtaining the report, based on the at least one identified abnormality and the location associated with the at least one abnormality for each of the at least one relevant predetermined region, from a trained report generating model, wherein the report generating model is a deep learning-based model, wherein obtaining the report comprises:
    inputting each of the at least one abnormality, latent embeddings associated with the test image, and the location associated with each of the at least one abnormality to the trained report generating model, wherein the report generating model is trained based on a Radiological Finding Quality Index (RFQI) loss with LSM loss; and
    receiving the report for the abnormality from the report generation model.

* * * * *